United States Patent
Mueller (10) Patent No.: US 10,718,422 B2
(45) Date of Patent: Jul. 21, 2020

(54) METHOD AND APPARATUS FOR TIGHTENING A THREADED FASTENER CONNECTION IN CONCEALED WALLS AND/OR FLOORS

(71) Applicant: Peter Baruch Mueller, Berkley, CA (US)

(72) Inventor: Peter Baruch Mueller, Berkley, CA (US)

(73) Assignee: Peter Baruch Mueller, Berkeley, CA (US)

( * ) Notice: Subject to any disclaimer, the term of this patent is extended or adjusted under 35 U.S.C. 154(b) by 148 days.

(21) Appl. No.: 15/994,594

(22) Filed: May 31, 2018

(65) Prior Publication Data

US 2018/0274653 A1    Sep. 27, 2018

Related U.S. Application Data (60) Provisional application No. 62/513,635, filed on Jun. 1, 2017.

(51) Int. Cl.

| F16H 57/039 | (2012.01) |
|---|---|
| E04B 1/41 | (2006.01) |
| F16H 1/16 | (2006.01) |
| F16H 57/021 | (2012.01) |
| F16H 57/00 | (2012.01) |
| F16H 57/031 | (2012.01) |
| E04B 1/38 | (2006.01) |
| E04B 1/348 | (2006.01) |
| E04B 2/74 | (2006.01) |

(52) U.S. Cl.
CPC ............ *F16H 57/039* (2013.01); *E04B 1/40* (2013.01); *F16H 1/16* (2013.01); *F16H 57/0025* (2013.01); *F16H 57/021* (2013.01); *F16H 57/031* (2013.01); *E04B 1/34815* (2013.01); *E04B 2001/405* (2013.01); *E04B 2002/749* (2013.01); *F16H 2057/0213* (2013.01)

(58) Field of Classification Search
CPC ...... F16H 57/039; F16H 1/16; F16H 57/0025; F16H 57/021; F16H 57/031; E04B 1/40
See application file for complete search history.

(56) References Cited

U.S. PATENT DOCUMENTS

| 3,583,176 | A | * | 6/1971 | Gordy | A23G 9/12 62/342 |
|---|---|---|---|---|---|
| 3,771,447 | A | * | 11/1973 | Easoz | B41F 31/045 101/365 |
| 3,987,740 | A | * | 10/1976 | Merson | B21D 39/021 29/243.58 |

FOREIGN PATENT DOCUMENTS

| JP | 59117954 A | * | 7/1984 | .......... F16H 57/039 |

* cited by examiner

*Primary Examiner* — Thomas C Diaz
(74) *Attorney, Agent, or Firm* — Platinum Intellectual Property LLP (57) ABSTRACT

A threaded fastener actuator that includes a worm-gear used to transfer rotational power to an impeller gear. The impeller gear includes a polygonal channel for receiving an actuator feature included in a threaded fastener. As the worm-gear is rotated, the impeller gear rotates about a vertical movement axis, which causes the threaded fastener contained in polygonal channel to also rotate and engage with a corresponding threaded coupler.

7 Claims, 7 Drawing Sheets

METHOD AND APPARATUS FOR TIGHTENING A THREADED FASTENER CONNECTION IN CONCEALED WALLS AND/OR FLOORS

RELATED APPLICATIONS

The present application claims priority to U.S. Provisional Application Ser. No. 62/513,635 filed on Jun. 1, 2017 and entitled "NOVEL CONNECTION AND SEALING DEVICE FOR BOLT CONNECTIONS BETWEEN CONCEALED WALLS AND/OR FLOORS", by Mueller, the text and figures of which are incorporated into this application in their entirety.

BACKGROUND

In days gone by, the notion of modular construction brought about images of trailer parks in the middle of the desert. In that early era of modular construction, mobile homes were crafted as a complete package. A mobile home was a self-contained structure that included all plumbing, electrical and heating and air-conditioning systems. Typically, the same building codes applied to mobile home construction, except for certain structural elements where weight would be prohibitive. Because the entire mobile home was completed in the factory, the factory could control how the internal mechanical systems were integrated and assembled.

Modernly, modular construction refers to systems that are prefabricated and shipped for assembly. These prefabricated building components are intended to last as long as, if not longer than their traditional construction counterparts. Prefabricated components are used to construct permanent edifices. From office buildings to single-family dwellings to apartment complexes, prefabricated components provide excellent structural integrity, mechanical reliability and reduced cost. Cost reduction, as might be imagined, is realized by economies of scale where prefabricated components are fabricated in a factory. Factories that produce prefabricated building components also aspire to greater quality in their finished goods. As such, many prefabricated building components are produced to high quality standards such as ISO-9000.

There is still a great deal of evolution that needs to take place in the prefabricated building component technical space. For example, prefabricated building components that include plumbing still require manual assembly and coupling of plumbing included in the prefabricated component to site-constructed elements or to other prefabricated components. In order to support such assembly, the industry has no choice but to provide cover plates so that the plumbing connections can be completed during final assembly and integration of prefabricated components.

Another aspect that needs improvement is in the realm of fastening systems. Because prefabricated components are, in essence, fully sealed, there are significant hurdles in attaching one component to another or attaching a component to a structural member of a site-constructed element. As might be imagined, sealed, prefabricated components cannot be fastened to each other using traditional fasteners such as nails or wood screws.

BRIEF DESCRIPTION OF THE DRAWINGS

Several alternative embodiments will hereinafter be described in conjunction with the appended drawings and figures, wherein like numerals denote like elements, and in which.

DETAILED DESCRIPTION

Figure 1:
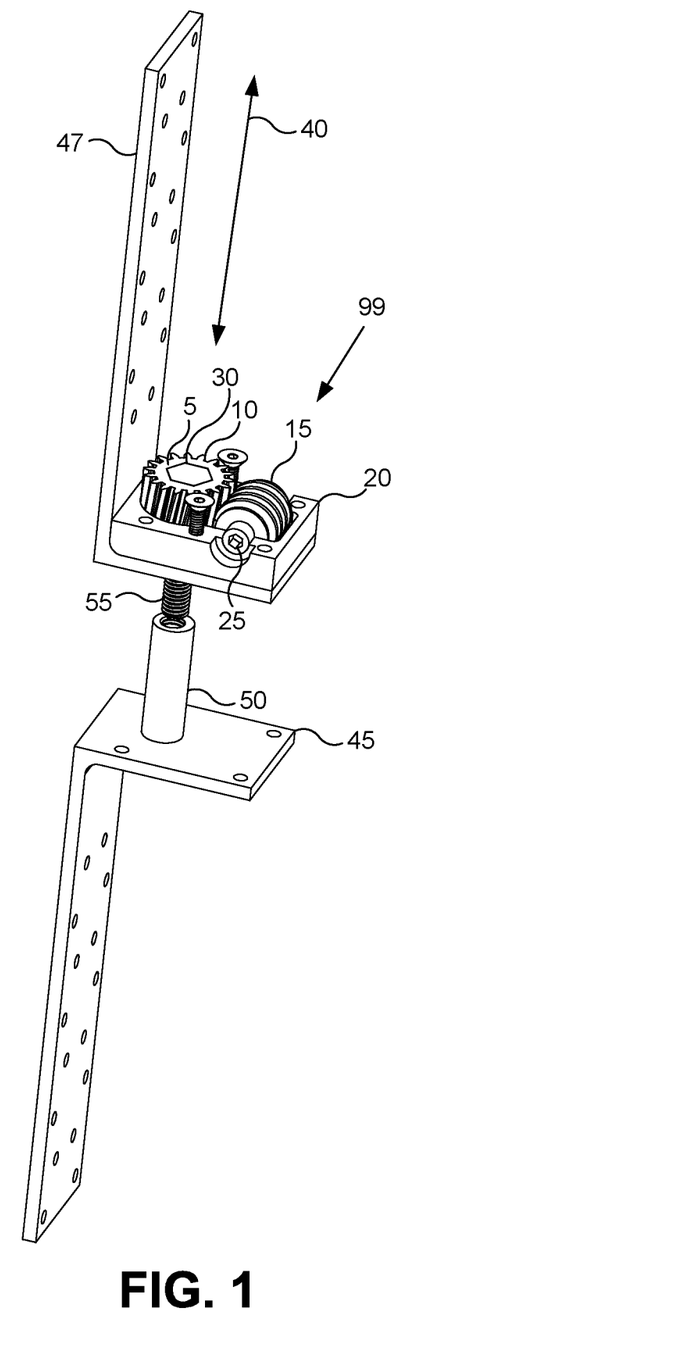
FIG. 1 is a pictorial diagram that illustrates one example embodiment of a threaded fastener actuator.

FIG. 1 is a pictorial diagram that illustrates one example embodiment of a threaded fastener actuator. According to this example embodiment, a threaded fastener actuator 99 comprises an impeller gear 5, a worm-gear 15, and a housing. It should be appreciated that, according to this example embodiment, the housing includes a bottom portion 20 and a top portion 23 (which is shown in FIG. 3).

This example embodiment includes an impeller gear 5 that includes a polygonal channel 30, which extends through the impeller gear 5. As also seen in the figure, the impeller gear 5 includes a worm-wheel feature 10 disposed around its outer perimeter. The worm-gear 15 is disposed so as to engage with the worm-wheel feature 10 included in the impeller gear 5. The impeller gear 5 also includes a polygonal channel 30. The polygonal channel 30 is intended to correspond to an actuation feature included in a threaded fastener, for example the head of a threaded fastener 55.

Figure 3:
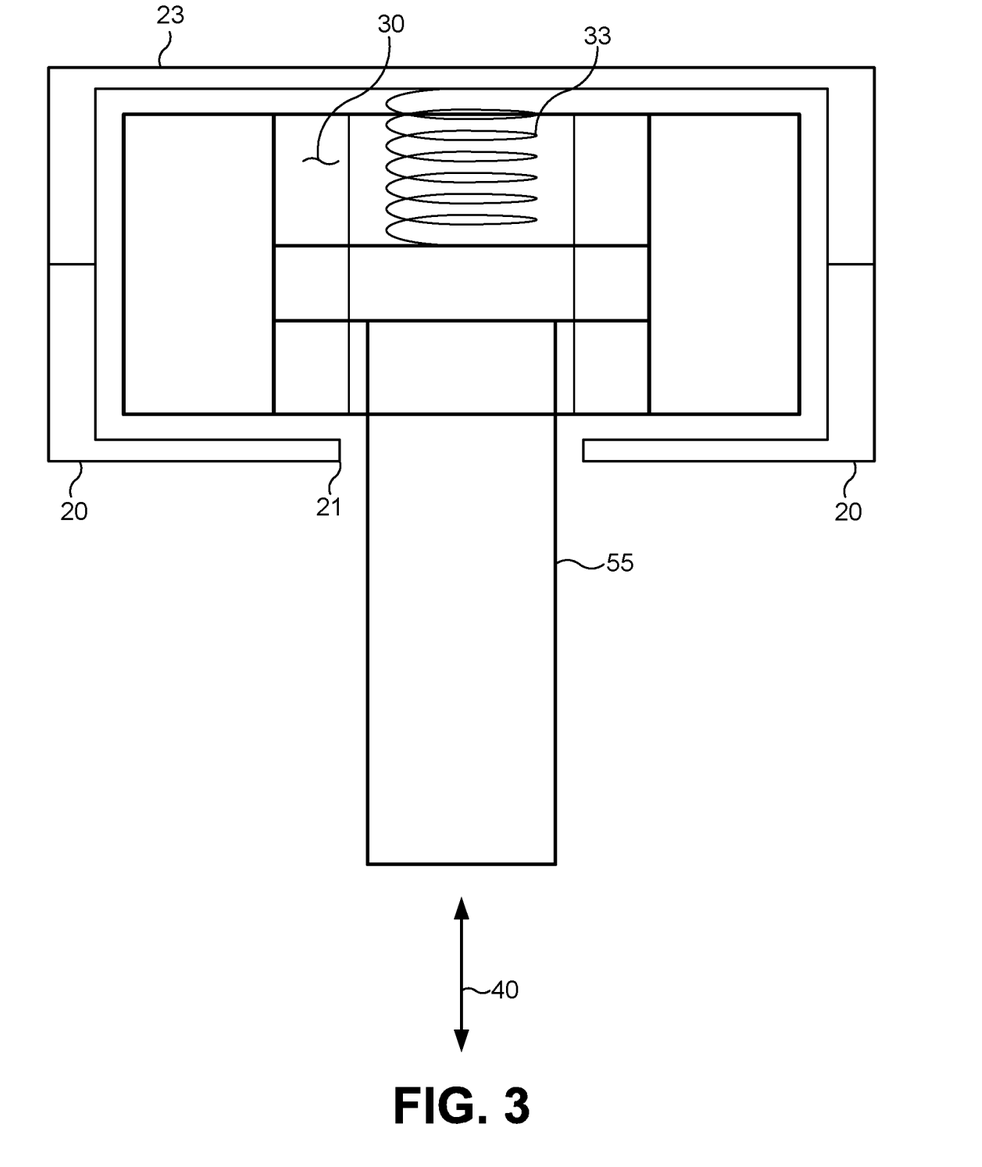
FIG. 3 is a cross-section diagram that depicts one alternative example embodiment of a threaded fastener actuator that includes a spring that is disposed to encourage a threaded fastener to remain at the bottom of the polygonal channel.

In this example embodiment, as seen in FIG. 3, the upper portion of the housing 23 substantially restrains the impeller gear 5 and the worm-gear 15 from moving upward along a vertical movement axis 40. It should be appreciated that the vertical movement axis 40 is orthogonal to a plane coincident with a top surface of the top portion of the housing 23. The vertical movement axis 40 is also substantially orthogonal to the rotational direction of the impeller gear 5. It should also be apparent from this drawing that the lower portion of the housing 20 substantially restrains the impeller gear 5 and the worm-gear 15 from moving downward along the vertical movement axis 40. In this example embodiment, the worm-gear 15 includes a rotational actuation feature 25. The rotational actuation feature 25, according to one alternative example embodiment, comprises a hexagonal cavity, which is structured to accommodate a hex-wrench.

It should be apparent by the study of the drawings that, as the rotational actuation feature 25 is rotated, the rotation of the worm-gear 15 causes the impeller gear 5 to rotate. This causes the threaded fastener 55 to rotate about the vertical movement axis 40. Continued rotation of the threaded fastener 55 relative to a threaded coupler 50 causes engagement of corresponding threads included in the threaded fastener 55 and the threaded coupler 50.

Figure 2:
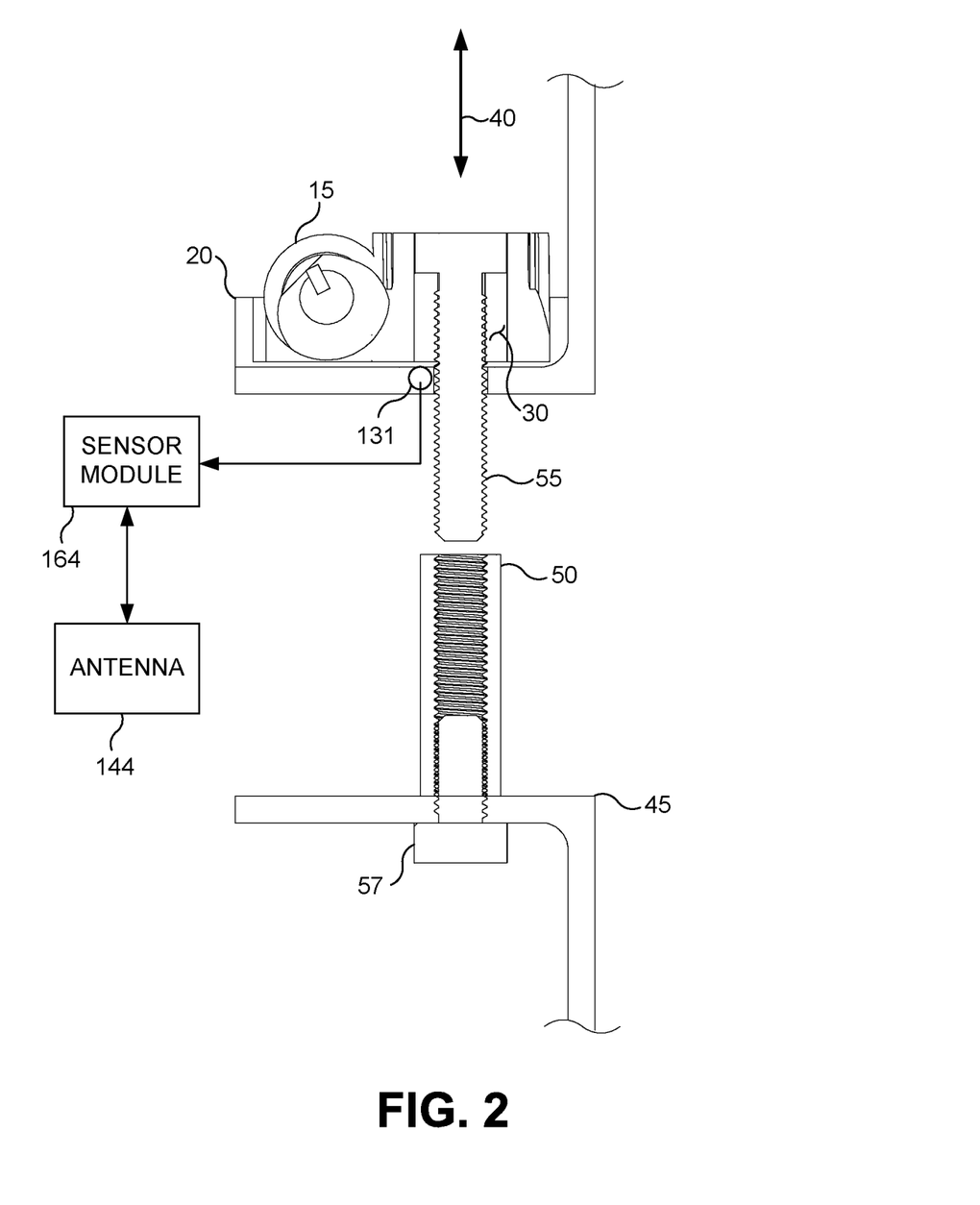
FIG. 2 is a cross-section diagram of one example embodiment of a threaded fastener actuator.

FIG. 2 is a cross-section diagram of one example embodiment of a threaded fastener actuator. According to one alternative example embodiment, the threaded fastener actuator 99 further includes a threaded fastener 55, which is disposed in the polygonal channel 30. According to one alternative example embodiment, the threaded fastener actuator 99 further includes a sensor 131 disposed to detect when the threaded fastener 55 has reached a terminal position. It should be appreciated that such terminal position, according to one illustrative use case, corresponds to a position of the threaded fastener at the lowest portion of the polygonal channel 30. And, it should likewise be appreciated that such terminal position, according to various illustrative use cases, also corresponds to a position of the threaded fastener 55 once it has fully engaged with a corresponding threaded coupler 50.

The sensor 131 is electrically coupled to an included sensor module 164 that includes a circuit for sensing the state of the sensor 131. The circuit operates from power received by means of an antenna 144, which is also electrically coupled to the sensor module 164. The antenna is also included in one alternative embodiment of the threaded fastener actuator 99.

In operation, the antenna 144 receives radio-frequency energy and directs the energy to the sensor module 164 where it is used to power a circuit. The circuit, as it operates, senses the state of the sensor and generates an RF signal according to the state of the sensor.

FIG. 3 is a cross-section diagram that depicts one alternative example embodiment of a threaded fastener actuator that includes a spring that is disposed to encourage a threaded fastener to remain at the bottom of the polygonal channel. According to this alternative example embodiment, the threaded fastener actuator 99 further includes a threaded fastener 55, which is disposed in the polygonal channel 30. This alternative example embodiment also includes a spring 33, which is also disposed in the polygonal channel between an inner surface of the top portion of the housing 23 and the fastener 55.

FIG. 1 further illustrates that, according to one illustrative use case, a threaded fastener actuator 99 is used in conjunction with a top bracket 47 and a bottom bracket 45. In this illustrative use case, the bottom bracket 45 includes a threaded coupler 50, which engages with the threaded fastener 55. When the two brackets are brought together, the threaded portion of the threaded fastener 55 must engage with an internal thread included in the coupler 50. It should be appreciated that some amount of downward force must be applied to the threaded fastener 55 in order to encourage engagement of the threads included on the threaded fastener with the internal threads included in the threaded coupler 50. Accordingly, this alternative example embodiment provides for such force through the use of the spring 33.

Figure 4:
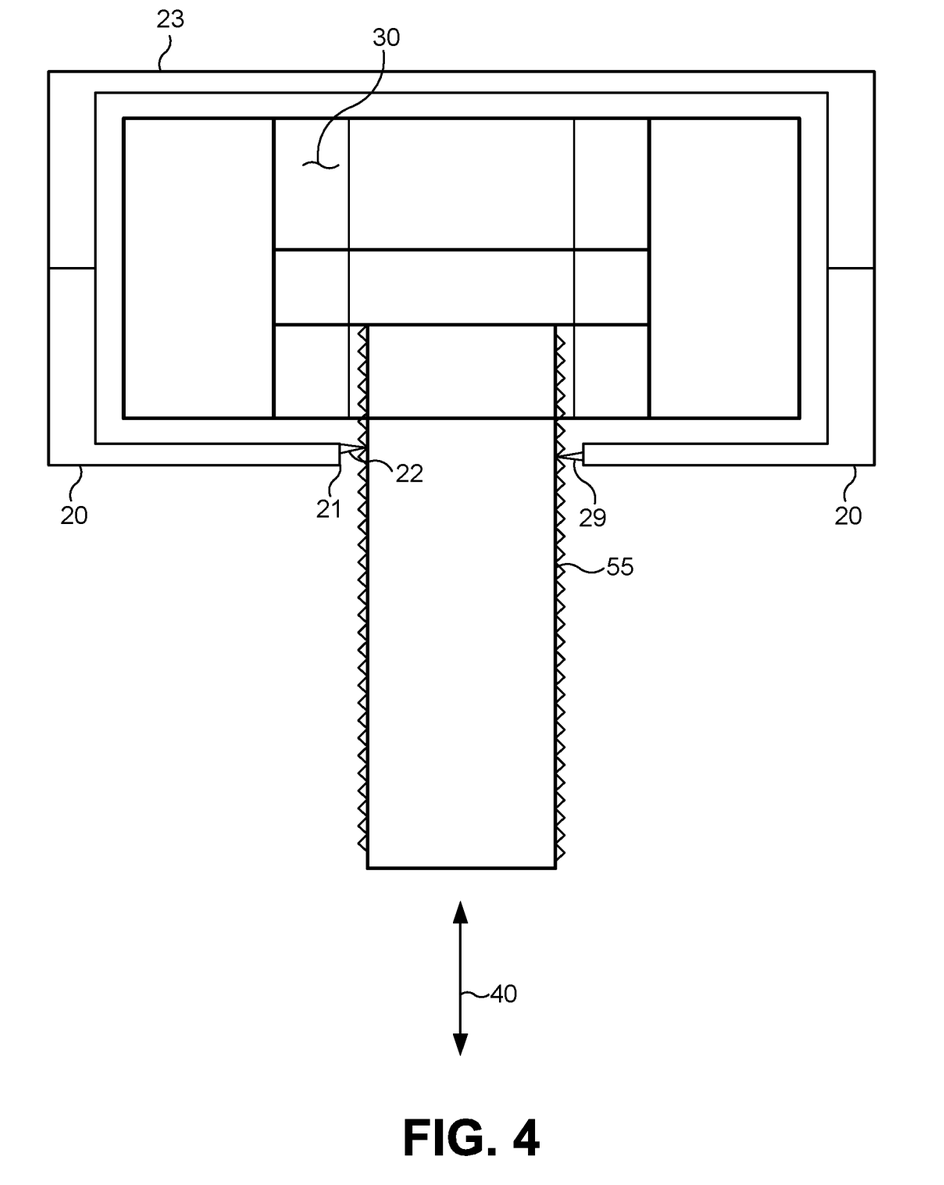
FIG. 4 is a cross-section diagram that depicts one alternative example embodiment of a threaded fastener actuator that includes a slip-thread for helping engage a threaded fastener with a threaded coupler.

FIG. 4 is a cross-section diagram that depicts one alternative example embodiment of a threaded fastener actuator that includes a slip-thread for helping engage a threaded fastener with a threaded coupler. In this alternative example embodiment, the lower portion of the housing 20 includes a slip thread (22, 29) disposed about the perimeter of the opening 21 included in the lower portion of the housing 20. It should be appreciated that the slip thread will jump across one or more threads included in the threaded fastener 55. The slip thread, according to one alternative example embodiment, includes a first partial thread 22 disposed along a portion of a first side of the opening 21 and second partial thread 29 disposed along a portion on a second side of the opening 21. It should be noted that, according to this alternative example embodiment, the first partial thread 22 and the second partial thread 29 are displaced vertically to correspond to the pitch of the threads included in the threaded fastener 55.

Figure 5:
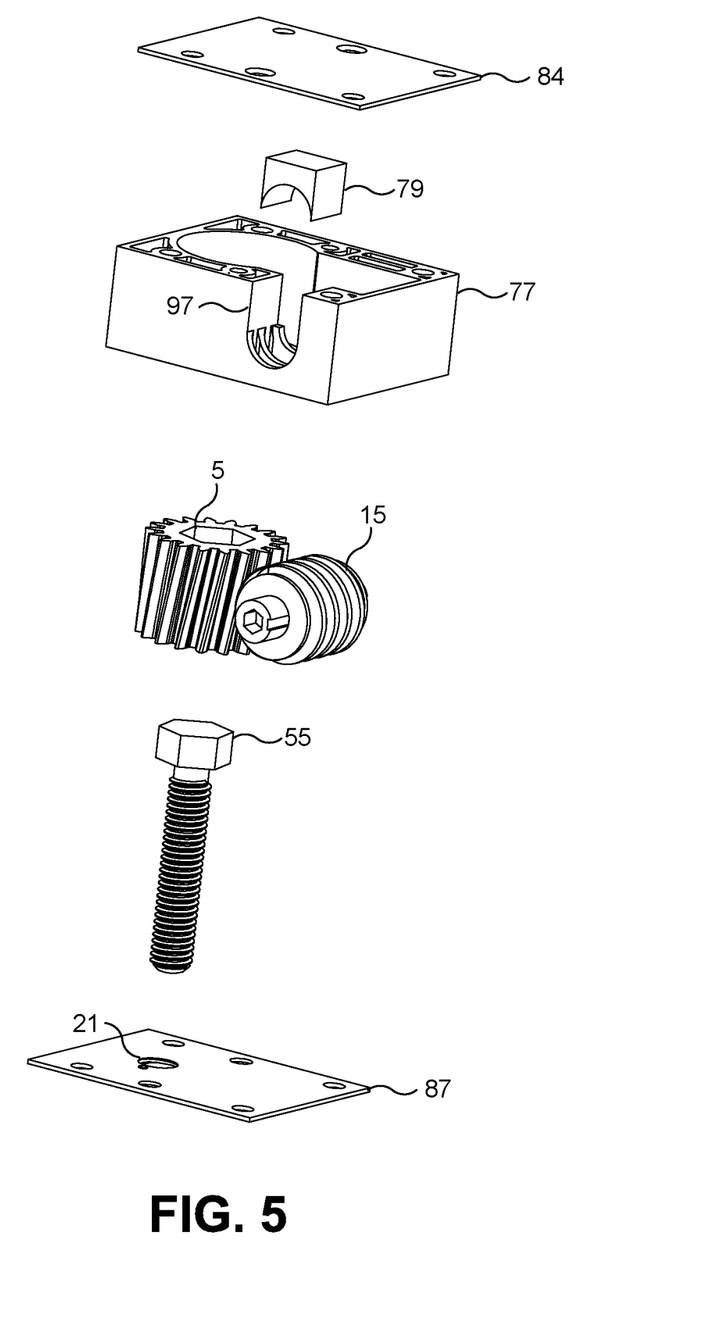
FIG. 5 is a perspective view of one alternative example embodiment of a housing.

FIG. 5 is a perspective view of one alternative example embodiment of a housing. According to this alternative example embodiment, a housing comprises an extruded element 77. The extruded element 77 couples with a top portion of the housing, which in this alternative example embodiment comprises a top plate 84. The extruded element 77 also couples with a bottom portion of the housing, which in this alternative example embodiment comprises a bottom plate 87. In this alternative example embodiment, the bottom plate 87 includes an opening 21, which allows a threaded fastener 55 to protrude downward out of the housing. It should be appreciated that, according to this alternative example embodiment, the extruded element 77 includes features for containing the impeller gear 5 and the worm-gear 15. To facilitate installation of the worm-gear 15, a channel 97 is cut in a first side of the extruded element 77 so that one end of the worm-gear 15 may be fitted into a second side of the extruded element 77. The worm-gear 15 then drops into the slot 97. A bushing 79 is then introduced to hold the worm-gear 15 in position.

Figure 6:
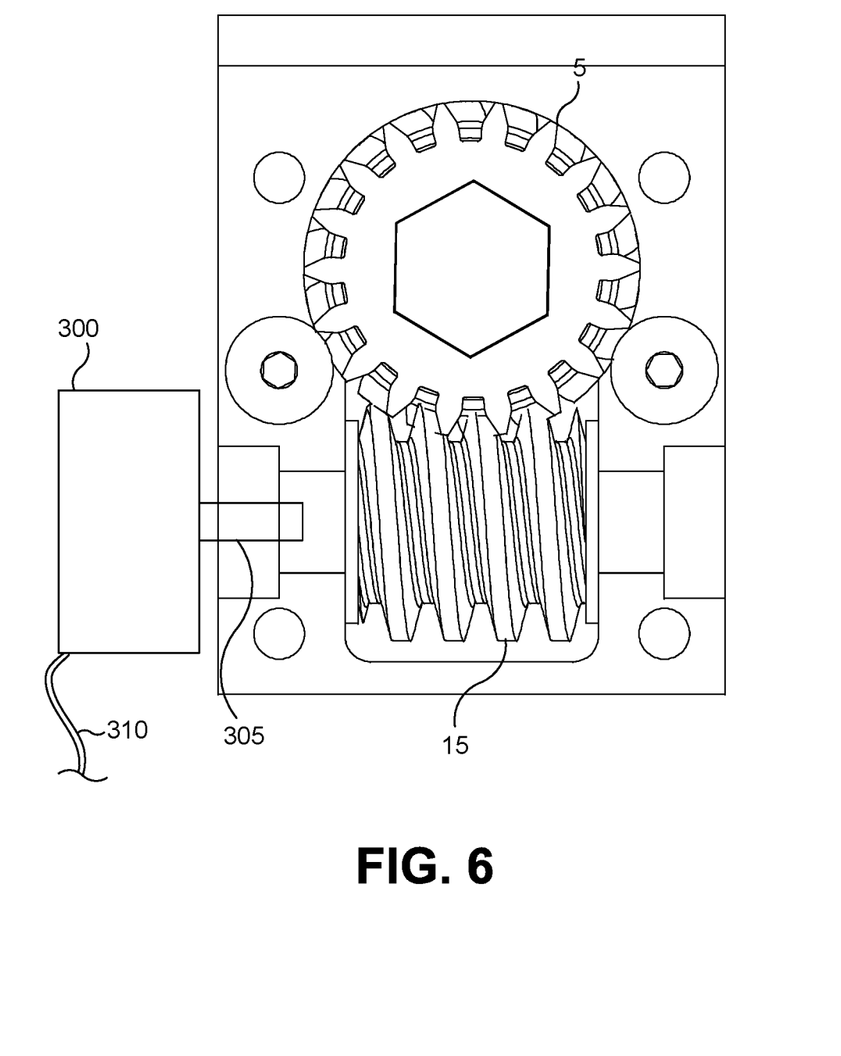
FIG. 6 is a cross-section view that depicts installation of an actuator.

FIG. 6 is a cross-section view that depicts installation of an actuator. According to various alternative example embodiments, a threaded fastener actuator 99 further includes an actuator 300. According to one alternative example embodiment, the actuator comprises an electric motor. In yet another alternative example embodiment, the actuator comprises a hydraulic motor. And in yet another alternative example embodiment, the actuator comprises a pneumatic motor. Irrespective of the type of actuator applied, all variations of these embodiments include an actuator that creates a rotational force. An actuator 300 receives power by way of a power connection 310. When power is applied to the actuator 300, the actuator 300 develops rotational force and applies the rotational force to an actuator rod 305. It should likewise be appreciated that power to the actuator 300, according to one alternative example embodiment, is applied with polarity so that application of power in one polarity causes the actuator to rotate in a clockwise direction while power in an alternative polarity causes the actuator to rotate in a counterclockwise direction.

It should be apparent that shifting polarity to an electric motor is accomplished by swapping positive and negative voltage to a direct current motor. Hydraulic motors require a secondary power path so that a working fluid, e.g. hydraulic oil, has a return path and the direction of fluid flow corresponds to the direction of actuator rotation. A pneumatic motor also requires a secondary power path, but the secondary power path is typically used to apply air pressure in order to achieve counter direction in rotation. It should be apparent to those skilled in the art that a pneumatic motor will typically simply expel low-pressure air to the ambient environment.

It should be appreciated that the actuator herein described is utilized with a threaded fastener actuator 99 herein described and is therefore included in one alternative example embodiment thereof. The actuator rod 305 couples with the rotational actuation feature 25 included in a worm-gear 15. Accordingly, this actuator mechanism is intended to be a universal actuator for various embodiments as herein described and may be further contemplated by the description set forth herein.

Figure 7:
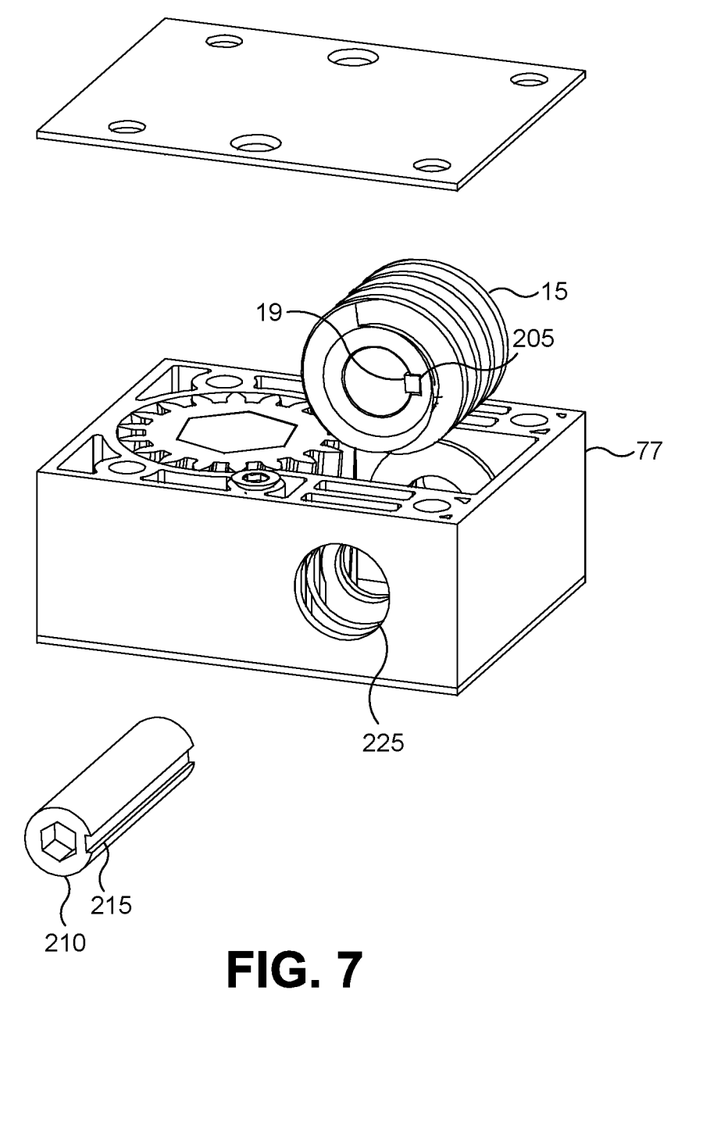
FIG. 7 is an exploded view that illustrates an alternative example embodiment for installing a worm gear into an extruded element.

FIG. 7 is an exploded view that illustrates an alternative example embodiment for installing a worm gear into an extruded element. In this alternative example embodiment, the worm-gear 15 includes a key-way 205, which is cut into an internal surface of the worm-gear 15. Once the worm-gear is dropped into the extruded element 77, a worm-gear axle 210 is inserted through a first and second wall included in the extruded element 77. It should be appreciated that each side of the extruded element 77 includes such openings 225 as necessary to allow the worm-gear axle 210 to be installed through the worm-gear 15. Accordingly, the worm-gear axle 210 also includes a key-way 215. The key-way 215 included in the worm-gear axle 210 is aligned with the key-way included in the worm-gear 15 and a key-pin 19 is installed. The key-pin 19 prevents the rotation of the worm-gear 15 relative to the worm-gear axle 210.

While the present method and apparatus has been described in terms of several alternative and exemplary embodiments, it is contemplated that alternatives, modifications, permutations, and equivalents thereof will become apparent to those skilled in the art upon a reading of the specification and study of the drawings. It is therefore intended that the true spirit and scope of the claims appended hereto include all such alternatives, modifications, permutations, and equivalents.

What is claimed is:

1. A threaded fastener actuator comprising:
    an impeller gear comprising an inner polygonal channel extending through the impeller gear and an outer perimeter wherein the outer perimeter includes a worm-wheel feature;
    a worm-gear disposed to engage with the worm-wheel feature, said worm-gear including a rotational actuation feature;
    a housing to contain the impeller gear and the worm-gear, wherein said housing includes a top portion that substantially restrains the impeller gear and the worm-gear from moving upward along a vertical movement axis, said vertical movement axis being defined as orthogonal to a plane coincident with a rotational plane of the impeller gear, and wherein the housing includes a bottom portion that substantially restrains the impeller gear and the worm-gear from moving downward along the vertical movement axis, and wherein the housing includes an opening in the bottom portion to allow a threaded-end of a threaded fastener to protrude downward from the housing when an engagement-end of the threaded fastener is situated in the polygonal channel; and
    a position sensor disposed to detect when a threaded fastener disposed in the polygonal channel is at a terminal position, wherein the position sensor generates a sensor status signal.

2. The threaded fastener actuator of claim 1 wherein the housing comprises an extruded containment extending substantially along the vertical movement axis and wherein the top and bottom portions comprise cover plates that are attached to the extruded containment by one or more fasteners.

3. The threaded fastener actuator of claim 2 wherein the extruded containment comprises a first vertical wall and a second vertical wall and wherein said vertical walls include corresponding openings disposed to receive an axle for the worm gear and wherein the worm gear includes a key-way cut into an internal surface and the worm gear axle includes a corresponding key-way cut into his external surface.

4. The threaded fastener actuator of claim 1 comprising an actuator coupled to the rotational actuation feature of the worm-gear and wherein the actuator comprises at least one of an electric motor, a hydraulic motor and a pneumatic motor.

5. The threaded fastener actuator of claim 1 further comprising:
    threaded fastener disposed in the polygonal channel; and
    spring disposed in the polygonal channel and situated to apply a force on the threaded fastener to cause the threaded fastener to move downward out of the polygonal channel.

6. The threaded fastener actuator of claim 1 wherein the opening in the bottom portion of the housing includes a slip-thread, said slip-thread configured to partially engage with the thread of a threaded fastener.

7. The threaded fastener actuator of claim 1 further comprising:
    a sensor module that receives power from an antenna, uses the power to operate a circuit, said circuit capable of:
        detecting the sensor status signal,
        generating a sensor state based on the sensor status signal,
        generating a radio signal that includes information for the sensor state, and
    conveying the sensor state to a receiver.

* * * * *